2,912,429
SYNTHESIS OF HEXAFLUOROAZOMETHANE

Charles W. Tullock, Wilmington, Del., assignor to E. I. du Pont de Nemours and Company, Wilmington, Del., a corporation of Delaware No Drawing. Application February 10, 1958
Serial No. 714,066

10 Claims. (Cl. 260—192)

This invention relates to a new method of preparing certain fluorine-containing organic compounds. More particularly, it relates to a new and improved method of preparing hexafluoroazomethane and other valuable organic fluorine compounds.

Hexafluoroazomethane, $F_3C—N=N—CF_3$, is a gas characterized by high stability towards chemical agents. It is of considerable technical interest because it is known to decompose under the influence of physical agents such as a flame, an electric spark or ultraviolet light to give fluorocarbons of great industrial value, including carbon tetrafluoride, hexafluoroethane and tetrafluoroethylene [Ruff and Willenberg, Ber. 73, 724–9 (1940); Dacey and Young, J. Chem. Phys. 23, 1302–1304 (1955)].

Hexafluoroazomethane has been prepared by reaction of cyanogen chloride or cyanogen iodide with certain highly reactive fluorides in which the element combined with the fluorine is in its highest valency stage, such as iodine pentafluoride (Ruff and Willenberg, loc. cit.; Dacey and Young, loc. cit.) or silver bifluoride (Glemser et al., Ger. Patent 1,005,972, which also discloses as operable cobalt trifluoride, manganese tetrafluoride, cerium tetrafluoride, bismuth pentafluoride and antimony pentafluoride). Such fluorides are known to be powerful fluorinating agents but they have the serious disadvantages of being costly, relatively inaccessible and poorly suitable for large scale operation, especially since practically all of them require the use of elemental fluorine for their preparation.

In spite of these drawbacks, it has heretofore been necessary to use such impractical reagents for the synthesis of hexafluoroazomethane, for the reason that more available but less reactive fluorides such as zinc fluoride, mercurous fluoride, lead difluoride, antimony trifluoride and silver monofluoride have been found incapable of fluorinating cyanogen halides [Ruff, Ber. A–69, 193 (1936); Collomon et al., J. Chem. Soc. 1953, 3709–3710; Woolf, ibid., 1954, 252–265]. Thus, it was totally unexpected to find that alkali metal fluorides, which are normally considered even more inert than the inoperable fluorides just mentioned, could under certain conditions react with cyanogen halides to give hexafluoroazomethane and other valuable fluorine compounds.

The novel process of the invention comprises heating at a temperature of at least 150° C. and under essentially anhydrous conditions a cyanogen halide wherein the halogen has an atomic number from 17 to 53 with chlorine and a fluoride of an alkali metal of atomic number 11 to 19. The organic fluorine compounds formed may be isolated from the resultant product.

The mechanism of the reaction is not known with certainty, but the process may be represented by the following overall equation, using cyanogen chloride and sodium fluoride as illustrative reactants:

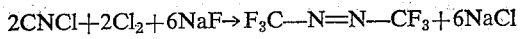

However, the actual reaction is more complex since other organic fluorine compounds are also formed in appreciable or detectable amounts. These include cyanuric fluoride,

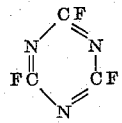

chlorotrifluoromethane, and, in small amounts, perfluoro-2-azapropene, $CF_3N=CF_2$, and bis(trifluoromethyl)-amine, $(CF_3)_2NH$. The latter is probably formed by addition to perfluoro-2-azapropene of hydrogen fluoride, which in turn may have resulted from hydrolysis of perfluoro-2-azapropene by adventitious moisture. These by-products of the reaction are themselves technically valuable. Thus, chlorotrifluoromethane is useful as a refrigerant gas, aerosol propellant, etc. Cyanuric fluoride, which has been previously prepared by reacting cyanuric chloride with hydrogen fluoride (Kwasnik, Fiat Review of German Science 1939–1946, Inorganic Chemistry, Part I, pp. 243–244) or with antimony dichlorotrifluoride (Bigelow et al., Abstracts of Papers, 130th American Chemical Society Meeting, p. 16M), is more reactive than cyanuric chloride and thus highly suitable for the preparation of cyanuric esters (Kwasnik, loc. cit.).

The inorganic reactants used in the process of this invention are chlorine and sodium or potassium fluoride. Commercially available materials are satisfactory since these reactants need not be rigorously pure. They should be substantially anhydrous. The organic reactant is a cyanogen halide, which can be the chloride, bromide or iodide, the first named being the preferred one since it is more readily available. The cyanogen halide can be employed as the preformed product, or it can be generated in situ by reaction of chlorine with one of the simple or complex metallic cyanides known to undergo such a reaction, e.g., sodium cyanide, mercuric cyanide, zinc cyanide, potassium ferricyanide, sodium ferrocyanide, calcium cyanide, Prussian blue and ferric cyanide. It is, however, preferred to use the preformed cyanogen halide since this leads to better conversions to hexafluoroazomethane and permits the use of lower reaction temperatures.

The relative proportions of the three reactants are not critical. They are important only to the extent that they influence the utilization of the cyanogen halide and the conversions to hexafluoroazomethane. The desired product can be obtained in appreciable amounts by using as little as two moles of alkali metal fluoride and one-half mole of elemental chlorine per mole of cyanogen halide. However, the best conversions to hexafluoroazomethane are obtained by using at least three moles of alkali metal fluoride and one mole of elemental chlorine per mole of cyanogen halide. Desirably, there is used a slight to moderate excess of alkali metal fluoride, e.g., 10–100%, over this amount. The molar ratio of alkali metal fluoride to chlorine will ordinarily be at least about 2:1. When the cyanogen halide (in this case, the chloride) is to be generated in situ from a metallic cyanide and chlorine, it is of course necessary to use sufficient additional chlorine to react with the metallic cyanide and form cyanogen chloride.

The reaction is impractically slow at temperatures below about 150° C. and it is therefore desirable to operate at at least that temperature, and preferably at least 200° C. Since the reaction products are heat-stable, the temperature can be quite high, e.g., up to 450° C. or even higher. The generally preferred temperature range is that between 225° and 350° C.

The process is conveniently carried out in corrosion-resistant pressure vessels under the autogenous pressure developed by the reactants and reaction products at the operating temperature. Additional pressure of an inert gas can be used if desired. A flow system, wherein the gaseous reactants are passed at or near atmospheric pressure over the alkali metal fluoride heated to reaction temperature, can also be used.

Contact between the reactants at operating temperature is maintained until at least a substantial amount of the cyanogen halide has been utilized. This can be determined, for example, by withdrawing a portion of the solid material (unreacted alkali metal fluoride and alkali metal halide formed during the reaction) and titrating the ionic halogen, other than fluorine, present therein. The reaction is normally continued until at least 25% of the total non-ionic halogen originally present (as added chlorine and as cyanogen halide) has been converted to ionic halogen. In the preferred temperature range, substantially no further reaction takes place after 2-6 hours contact.

The hexafluoroazomethane formed in the reaction can be isolated by bleeding out the volatile material from the reaction vessel, previously cooled to room temperature. This volatile product is, if desired, first treated to remove any excess chlorine which may be present. This can be done by maintaining the crude volatile product in contact with chlorine absorbants such as elemental sulfur, sodium iodide, potassium iodide, sodium sulfite or sodium bisulfite until the chlorine has been removed. The remaining gaseous product is then subjected to fractionation in a low temperature still, whereby the hexafluoroazomethane and volatile by-products such as chlorotrifluoromethane are separated. The less volatile reaction products such as cyanuric fluoride can be isolated by warming the solid residue left after removal of the gaseous materials.

The following examples illustrate the invention.

*Example I*

A one-liter bomb made of the nickel-iron-molybdenum alloy known as "Hastelloy C" was charged with 60 g. of cyanogen chloride, 200 g. of sodium fluoride and 70 g. of chlorine. The bomb was placed on an agitating rack and heated at 50° C. for 1 hour, 100° C. for 1 hour, 150° C. for 1 hour, and 235° C. for 4 hours. After cooling to room temperature, the gaseous reaction product (77 g.) was transferred from the bomb to a cold evacuated cylinder. The solid remaining in the bomb (237 g.) was washed with hot acetone, leaving 230 g. of inorganic solid which contained 28.2% of chloride ion. From this it was calculated that 62% of the chlorine originally present as elemental chlorine and cyanogen chloride had been converted to ionic chloride.

The crude volatile reaction product was stored over 125 g. of elemental sulfur at room temperature for 24 hours to remove the excess chlorine. There remained after this treatment 42 g. of chlorine-free gas. This material was bled into a low temperature still cooled to about −80° C., whose exit end led to a trap cooled in liquid nitrogen. During this operation there was collected in the cold trap 5 g. of a fraction (I) consisting of the most volatile product. This fraction was shown by infrared analysis to contain, on a molar basis, 75-80% of chlorotrifluoromethane, the remainder being mainly carbon dioxide.

Fractionation of the product condensed in the still pot gave 23 g. of a very pale yellow distillate (fraction II) boiling at −42 to −38° C. Mass spectrometric analysis showed that this product contained, on a molar basis, 58-64% of hexafluoroazomethane, whose identity was confirmed by comparison of its spectrum with that of an authentic sample prepared from cyanogen chloride and iodine pentafluoride; 28-32% of chlorotrifluoromethane and 3-3.5% of carbon dioxide, with possibly very small amounts of trifluoromethyl isocyanate, $CF_3NCO$, and perfluoro-2-azapropene, $CF_3N=CF_2$. This corresponds approximately to a 22% conversion of hexafluoroazomethane and a 5% conversion to chlorotrifluoromethane, based on the cyanogen chloride. Hexafluoroazomethane can be obtained in an essentially pure state (B.P. −32° C.) by refractionation of the distillate.

After removal of fraction II there remained in the still pot a small amount of higher boiling material. The higher boiling products thus obtained in four similar preparations were combined and distilled. This gave 6 g. of a fraction. B.P. −12 to −7° C., which was found by mass spectroscopy to contain, on a molar basis, about 70% of bis(trifluoromethyl)amine, $(CF_3)_2NH$, 10% of trichlorofluoromethane and 1-2% of carbon dioxide. Another fraction (6 g.), B.P. 23-27.5° C., consisted essentially of trichlorofluoromethane.

In another similar preparation, the solid material left in the reaction vessel after removal of the ingredients volatile at room temperature was heated to 150° C. under 1 mm. pressure for 1.3 hours, and the product volatile under these conditions was condensed in a cooled receiver and redistilled. There was thus isolated 11 g. of cyanuric fluoride, $(FCN)_3$, B.P. 68-85° C., which was further identified by comparison of its nuclear magnetic resonance spectrum with that of a known sample, and 1 g. of a product, B.P. 100-110° C., which was apparently cyanuric chlorodifluoride, $C_3N_3F_2Cl$.

It was observed during this series of preparations that the relative amounts of the several fluorine-containing reaction products were variable. This may have resulted in part from temperature surges, accompanied by rises of the internal pressure, which sometimes occurred during the heating periods. Similar temperature surges were also noted when hexafluoroazomethane was prepared by the known method involving reaction of a cyanuric halide with iodine pentafluoride.

When the process described in this example was carried out under the same conditions except that the reaction temperature was only 150° C., maintained for 4 hours, hexafluoroazomethane was obtained, but in much smaller amounts. Only 11.5% of the chlorine introduced as free chlorine and as cyanogen chloride was converted to ionic chloride.

*Example II*

A 500 ml. "Hastelloy C" bomb was charged with 12.5 g. (0.25 mole) of sodium cyanide, 42 g. (1.0 mole) of sodium fluoride and 35 g. (0.5 mole) of chlorine and was heated with agitation at 200° C. for 1 hour, 300° C. for 1 hour and 325° C. for 2 hours. After cooling to room temperature, the gaseous product (21 g.) was transferred from the bomb to a cold evacuated cylinder. The solid remaining in the bomb weighted 61 g. after extraction with warm acetone. It contained 26.94% of chloride ion, indicating that 46.2% of the total chlorine originally present had been converted to ionic chloride.

The volatile product was stored over potassium iodide at room temperature for two days to remove excess chlorine. The remaining chlorine-free volatile material, amounting to 9 g., was shown by infrared analysis to contain, on a molar basis, 65% of chlorotrifluoromethane and 5% of hexafluoroazomethane. The remainder comprised carbon dioxide, bis(trifluoromethyl)amine, dichlorodifluoromethane and trichlorofluoromethane.

*Example III*

A 500 ml. "Hastelloy C" bomb was charged with 33 g. (0.1 mole) of potassium ferricyanide, 100 g. (22.4 moles) of sodium fluoride and 85 g. (1.2 moles) of chlorine and was heated with agitation at 50° C. for 1 hour, 100° C. for 1 hour, 150° C. for 1 hour and 235° C. for 4 hours. The solid reaction product (144 g.) contained 16.48% of chloride ion, indicating that 28% of the total chlorine originally present had been converted to ionic chloride. The volatile product (69 g.) was stored over 125 g. of sulfur at room temperature for several days to remove excess chlorine. The remaining chlorine-free gas (13 g.) was shown by infrared analysis to contain, on a molar basis, 30% of hexafluoroazomethane, 5–10% of carbon dioxide and 10% of chlorotrifluoromethane, with bis(trifluoromethyl)amine and a small amount of perfluoro-2-azapropene.

I claim:

1. A process for the production of fluorinated organic compounds comprising heating at a temperature of at least 150° C. and under essentially anhydrous conditions a cyanogen halide wherein the halogen has an atomic number of from 17 to 53, with chlorine and a fluoride of an alkali metal of atomic number 11 to 19.

2. The process of claim 1 wherein the alkali metal fluoride is sodium fluoride.

3. The process of claim 1 wherein the cyanogen halide is cyanogen chloride.

4. The process of claim 1 wherein the cyanogen halide is formed in situ.

5. A process for the production of fluorinated organic compounds comprising heating at a temperature of at least 150° C. and under essentially anhydrous conditions cyanogen chloride, sodium fluoride and chlorine.

6. The process of claim 5 wherein the cyanogen chloride is formed in situ.

7. The process of claim 5 including the isolation of hexafluoroazomethane from the resultant product.

8. The process of claim 5 wherein the relative proportions are at least three moles of sodium fluoride and one mole of elemental chlorine to one mole of cyanogen chloride.

9. The process of claim 1 wherein the reaction temperature lies between 225 and 350° C.

10. The process of claim 5 wherein the reaction temperature lies between 225 and 350° C.

References Cited in the file of this patent

FOREIGN PATENTS 1,005,972   Germany _____ Apr. 11, 1957

OTHER REFERENCES

Ruff et al.: Berichte, vol. 73, 1940, pp. 724–9.
Groggins: "Unit Processes in Organic Synthesis," 1952, pp. 180, 181.